United States Patent
Lee et al.

(10) Patent No.: US 10,880,851 B2
(45) Date of Patent: Dec. 29, 2020

(54) METHOD FOR D2D OPERATION PERFORMED BY TERMINAL IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hanbyul Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 15/567,832

(22) PCT Filed: Apr. 20, 2016

(86) PCT No.: PCT/KR2016/004124
§ 371 (c)(1),
(2) Date: Oct. 19, 2017

(87) PCT Pub. No.: WO2016/171471
PCT Pub. Date: Oct. 27, 2016

(65) Prior Publication Data
US 2018/0167904 A1    Jun. 14, 2018

Related U.S. Application Data

(60) Provisional application No. 62/149,692, filed on Apr. 20, 2015, provisional application No. 62/150,285, filed on Apr. 21, 2015.

(51) Int. Cl.
*H04W 56/00* (2009.01)
*H04W 72/04* (2009.01)
*H04W 72/12* (2009.01)

(52) U.S. Cl.
CPC ..... *H04W 56/0045* (2013.01); *H04W 56/001* (2013.01); *H04W 56/002* (2013.01);
(Continued)

(58) Field of Classification Search
None
See application file for complete search history.

(56) References Cited

U.S. PATENT DOCUMENTS 8,699,317 B2    4/2014    Dinan
8,879,518 B2    11/2014   Ye
(Continued)

FOREIGN PATENT DOCUMENTS

KR    10-2014-0042914 A    4/2014
WO    WO 2014/175149 A1   10/2014
(Continued)

OTHER PUBLICATIONS

"3GPP E-UTRA Physical channels and modulation (Release 12)", 3GPP TS 36.211 V12.5.0, Mar. 2015 (Year: 2015).*
(Continued)

*Primary Examiner* — Jenkey Van
(74) *Attorney, Agent, or Firm* — Birch, Stewart, Kolasch & Birch, LLP

(57) ABSTRACT

The present invention provides a method for device-to-device (D2D) operation performed by a terminal in a wireless communication system, the method comprising the steps of: setting, as a second carrier, a timing reference of a first carrier on which D2D transmission is performed; determining D2D transmission timing advance (TA) information to be applied to the first carrier; and performing D2D transmission on the first carrier on the basis of the timing reference and the TA information.

4 Claims, 19 Drawing Sheets

(52) U.S. Cl.
CPC ....... *H04W 72/042* (2013.01); *H04W 72/121* (2013.01); *H04W 72/1278* (2013.01); *H04W 72/0406* (2013.01)

(56) References Cited

U.S. PATENT DOCUMENTS

| | | | |
|---|---|---|---|
| 2012/0250520 | A1 | 10/2012 | Chen et al. |
| 2015/0085719 | A1 | 3/2015 | Yin et al. |
| 2016/0302246 | A1* | 10/2016 | Chervyakov ......... H04L 5/1469 |
| 2017/0013640 | A1* | 1/2017 | Loehr ............... H04W 72/1284 |
| 2017/0070985 | A1* | 3/2017 | Uchino ................. H04W 56/00 |

FOREIGN PATENT DOCUMENTS

| | | |
|---|---|---|
| WO | WO 2015/005498 A2 | 1/2015 |
| WO | WO 2015/194857 A1 | 12/2015 |

OTHER PUBLICATIONS

Ericsson et al., "RRM Requirements for ProSe," 3GPP TSG-RAN WG4 Meeting #74, R4-151126, Athens, Greece, Feb. 9-13, 2015, 28 pages, XP050933032.

3GPP TR 36.843 V12.0.0 (Mar. 2014), "3rd Generation Partnership Project; Technical Specification Group Radio Access Network; Study on LTE device to device proximity services; Radio aspects (Release 12)", Technical Report, published on Mar. 2014.

3GPP TS 36.304 V8.5.0 (Mar. 2009). "3rd Generation Partnership Project; Technical Specification Group Radio Access Network; Evolved Universal Terrestrial Radio Access (E-UTRA); User Equipment (UE) procedures in idle mode (Release 8)", Technical Specification, published on Mar. 2009.

* cited by examiner

METHOD FOR D2D OPERATION PERFORMED BY TERMINAL IN WIRELESS COMMUNICATION SYSTEM, AND TERMINAL USING SAME

CROSS REFERENCE TO RELATED APPLICATIONS

This application is the National Phase of PCT International Application No. PCT/KR2016/004124, filed on Apr. 20, 2016, which claims priority under 35 U.S.C. 119(e) to U.S. Provisional Application Nos. 62/149,692 filed on Apr. 20, 2015 and 62/150,285 filed on Apr. 21, 2015, all of which are hereby expressly incorporated by reference into the present application.

BACKGROUND OF THE INVENTION

Field of the Invention

The present invention relates to wireless communication, and more particularly, to a method for a D2D operation performed by a terminal in a wireless communication system and a terminal using the same.

Related Art

The International Telecommunication Union Radio Communication Sector (ITU-R) is conducting a standardization operation of International Mobile Telecommunication (IMT)-Advanced which is a next-generation mobile communication system after 3rd generation. The IMT-Advanced aims to support IP (Internet Protocol) based multimedia service at data rate of 1 Gbps in stationary and low-speed moving states and 100 Mbps in a high-speed moving state.

The 3rd Generation Partnership Project (3GPP) as a system standard that meets the requirements of the IMT-Advanced prepares for LTE-Advanced (LTE-A) created by improving Long Term Evolution (LTE) based on Orthogonal Frequency Division Multiple Access (OFDMA)/Single Carrier-Frequency Division Multiple Access (SC-FDMA). The LTE-A is one of the strong candidates for the IMT-Advanced.

In recent years, there has been a growing interest in device-to device (D2D) technology for direct communication between devices. In particular, the D2D has attracted attention as communication technology for a public safety network. Commercial communication networks are rapidly changing to LTE, but current public safety networks are mainly based on 2G technology in terms of conflicts with existing communication standards and cost. The technological gaps and demands for improved services have led to efforts to improve the public safety networks.

The public safety networks have higher service requirements (reliability and security) than the commercial communication networks and require direct signal transmission and reception, or D2D operation, between the devices, particularly when coverage of cellular communications is insufficient or unavailable.

A D2D operation can have various advantages in that the D2D operation is signal transmission/reception between neighboring devices. For example, a D2D terminal has high data rate and low latency and is capable of data communication. In addition, the D2D operation can distribute traffic which concentrates on a base station and can also serve to expand the coverage of the base station if the D2D terminal serves as a relay.

In the related art, in order to carry out D2D transmission in a carrier which has been aggregated through aggregation of a carrier wave (or a carrier, hereinafter, the carrier wave and the carrier are mixed for convenience of description), the D2D transmission needs to be performed in respective carrier units. Therefore, when there are multiple carriers, the terminal performing the D2D operation needs to perform time synchronization or downlink measurement for each carrier. As described above, when the terminal performs synchronization or measurement for each carrier, a terminal computation amount is excessively increased, resulting in a problem that radio communication efficiency is deteriorated.

Accordingly, the present invention additionally proposes a method of configuring a reference carrier by the terminal performing the D2D operation and a method and apparatus for determining information on a timing advance by the terminal performing the D2D operation.

SUMMARY OF THE INVENTION

The present invention provides a method for a D2D operation performed by a terminal in a wireless communication system and a terminal using the same.

In an aspect, a method for device-to-device (D2D) operation performed by a terminal in a wireless communication system is provided. The method may comprise configuring, as a second carrier, a timing reference of a first carrier on which D2D transmission is performed, determining D2D transmission timing advance (TA) information to be applied to the first carrier and performing D2D transmission on the first carrier on the basis of the timing reference and the TA information.

The first carrier may be an FDD carrier, the second carrier may be a TDD carrier, and the determining of the timing advance information on the D2D transmission timing advance (TA) information to be applied to the first carrier may include determining the timing advance information to be applied to the first carrier based on the first carrier.

The mode 2 D2D communication may be performed on the first carrier, and the timing advance information is determined based on the mode 2 D2D communication.

The timing advance information may include NTA,SL and NTA,offset, a value of NTA,SL is 0, and the value of NTA,offset is 0.

When specific D2D communication is performed on the first carrier or when the first carrier is determined as in-coverage, the determining of the timing advance information on the D2D transmission timing advance (TA) information to be applied to the first carrier may include determining the timing advance information to be applied to the first carrier based on the first carrier.

The first carrier may be the FDD carrier, the second carrier may be the TDD carrier, and the determining of the timing advance information on the D2D transmission timing advance (TA) information to be applied to the first carrier may include determining the timing advance information to be applied to the first carrier based on the second carrier.

The mode 2 D2D communication may be performed on the first carrier, and the timing advance information may be determined based on the second carrier.

The timing advance information may include NTA,SL and NTA,offset, the value of has a value of TDD carrier based NTA, and the value of the NTA,offset has a value of 624 Ts.

In another aspect, a method for device-to-device (D2D) operation performed by a terminal in a wireless communication system is provided. The method may comprise receiving a specific transmission resource pool configuration to be applied to a first carrier on which D2D transmission is performed through a second carrier, determining the specific transmission resource pool configuration as a transmission resource pool configuration of the first carrier and performing the D2D transmission on the first carrier on the basis of the transmission resource pool configuration.

The specific transmission resource pool configuration may include an uplink-downlink configuration associated with the second carrier.

The second carrier may be a TDD carrier, and the uplink-downlink configuration may be an uplink-downlink configuration associated with TDD.

The second carrier may be the TDD carrier.

The specific transmission resource pool configuration may be an uplink-downlink configuration associated with the first carrier.

In other aspects, a terminal is provided. The terminal may comprise a radio frequency (RF) unit transmitting and receiving a radio signal and a processor operated in association with the RF unit, wherein the processor configures, as a second carrier, a timing reference of a first carrier on which D2D transmission is performed, determines D2D transmission timing advance (TA) information to be applied to the first carrier, and performs D2D transmission on the first carrier on the basis of the timing reference and the TA information.

According to the present invention, provided are a method for a D2D operation performed by a terminal in a wireless communication system and a terminal using the same.

According to the present invention, the terminal can configure one carrier which becomes a reference and perform time synchronization or downlink measurement only in the reference carrier. Therefore, the terminal may not perform synchronization or measurement for each carrier, and as a result, a terminal computation amount can be reduced. Moreover, for example, when WAN transmission is performed on a first carrier and D2D transmission is performed on a second carrier, the terminal can perform power allocation based on the carrier which becomes the reference. Accordingly, the terminal can prevent power from being allocated to be overlapped or reduced, and as a result, power allocation efficiency can increase.

DESCRIPTION OF EXEMPLARY EMBODIMENTS

Figure 1:
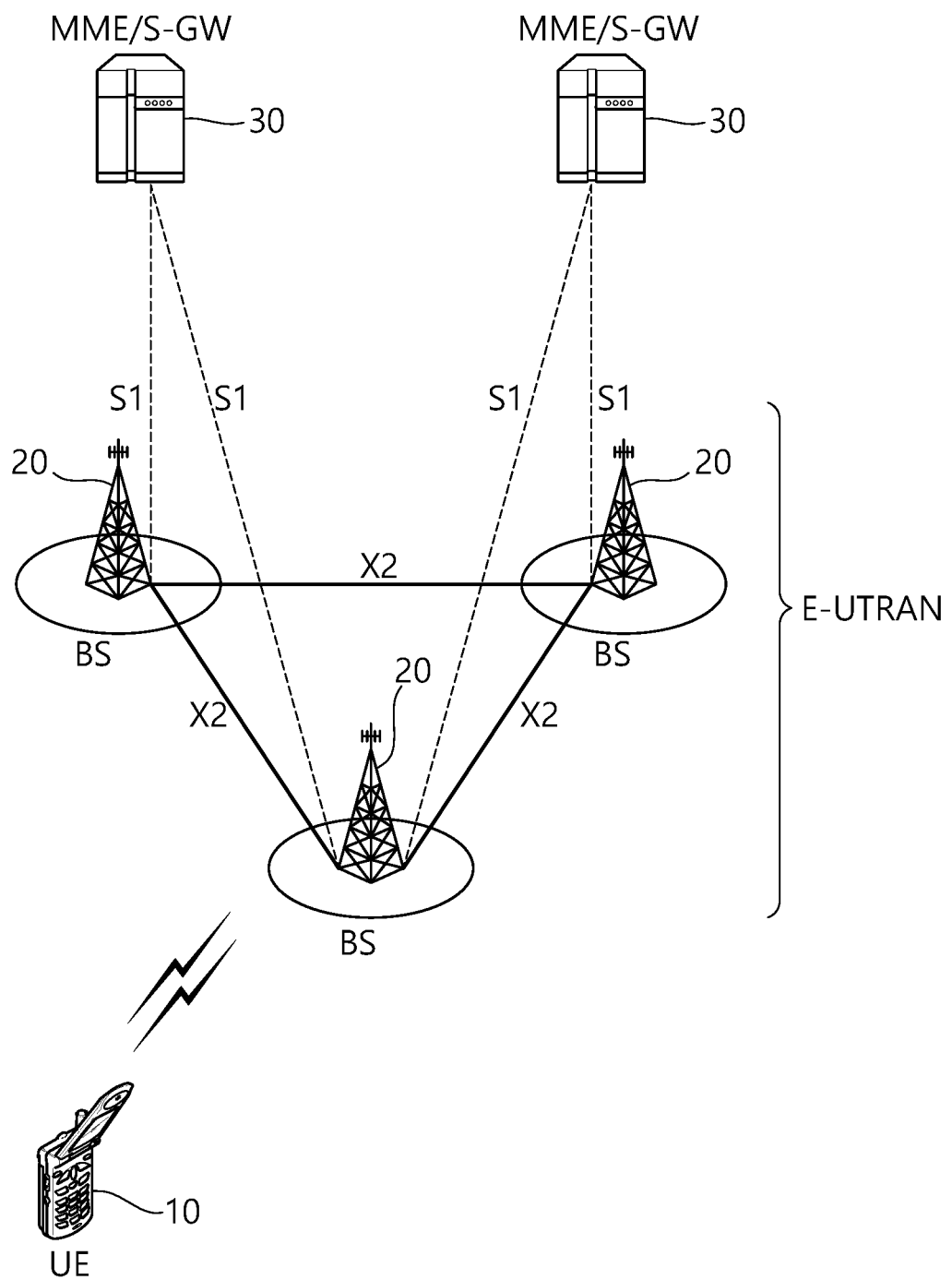
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
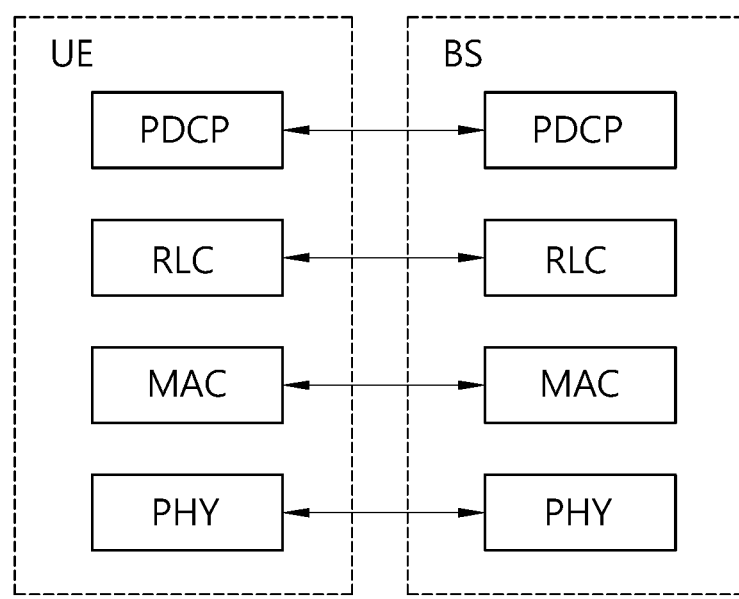
FIG. 2 is a diagram showing a wireless protocol architecture for a user plane.
Figure 3:
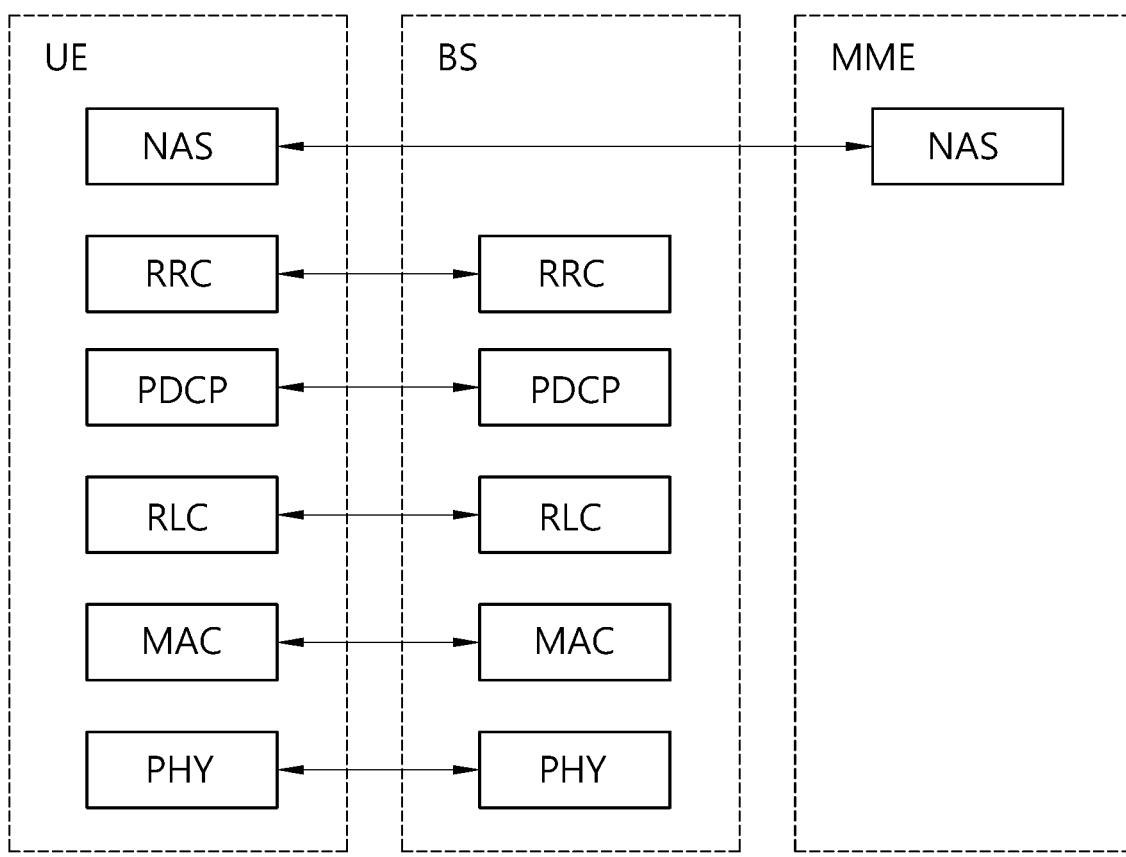
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG 3) A barred cell: this cell is a cell that broadcasts information indicative of a barred cell through system information.

4) A reserved cell: this cell is a cell that broadcasts information indicative of a reserved cell through system information.

Figure 4:
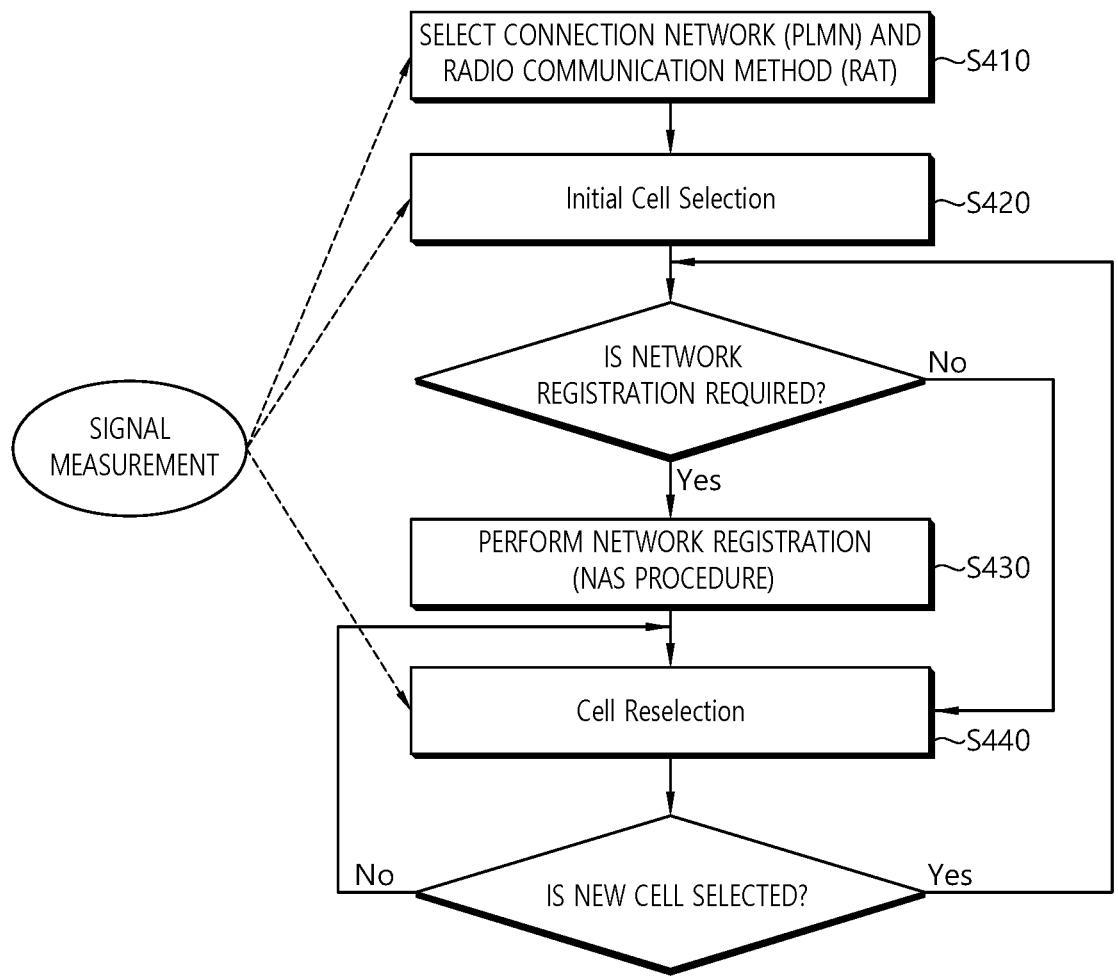
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
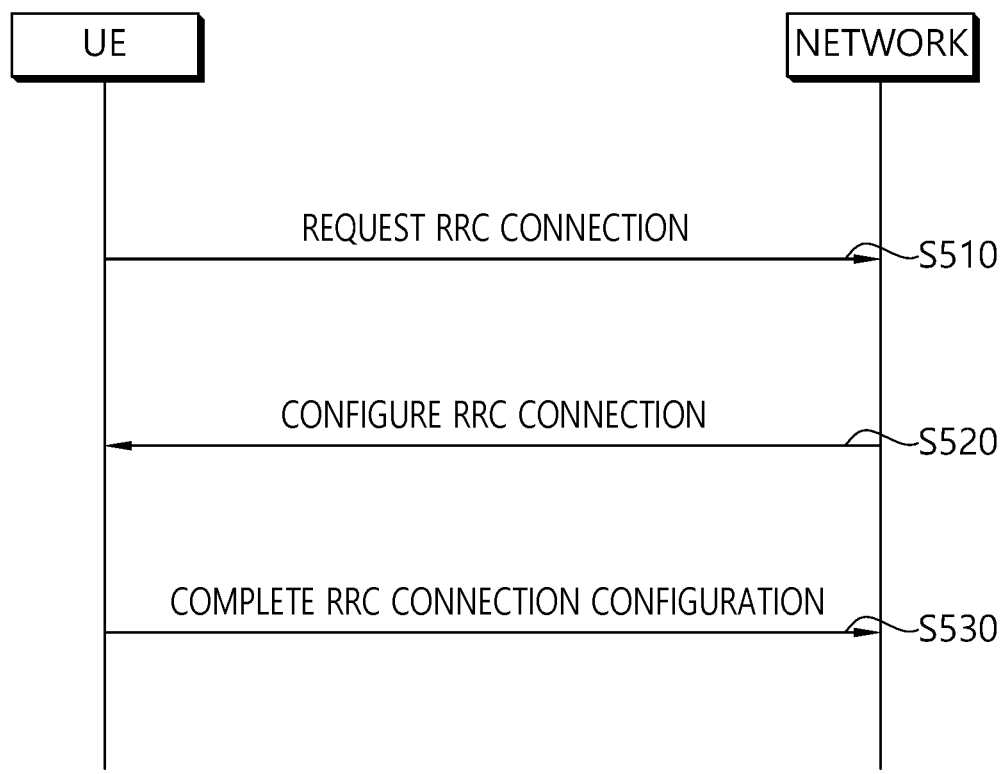
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
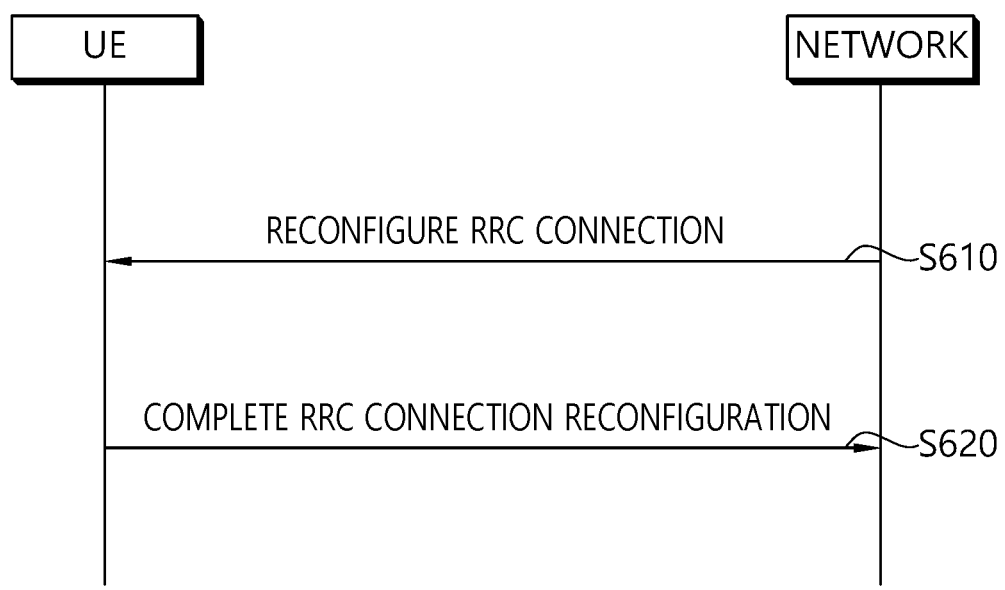
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev>0 \text{ AND } Squal>0, \quad [\text{Equation 1}]$$

where:

$$Srxlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |

TABLE 1-continued

| | |
|---|---|
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
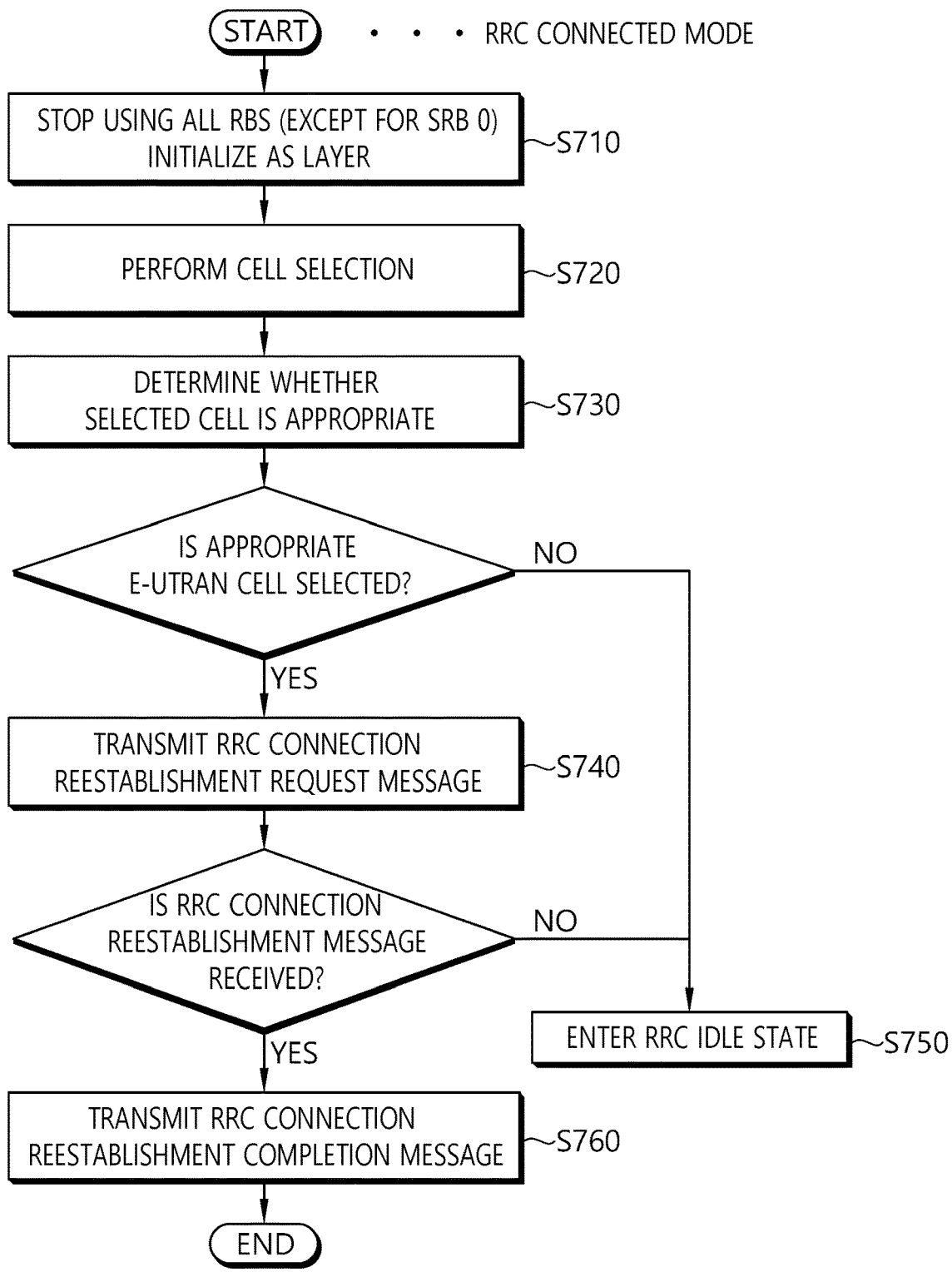
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
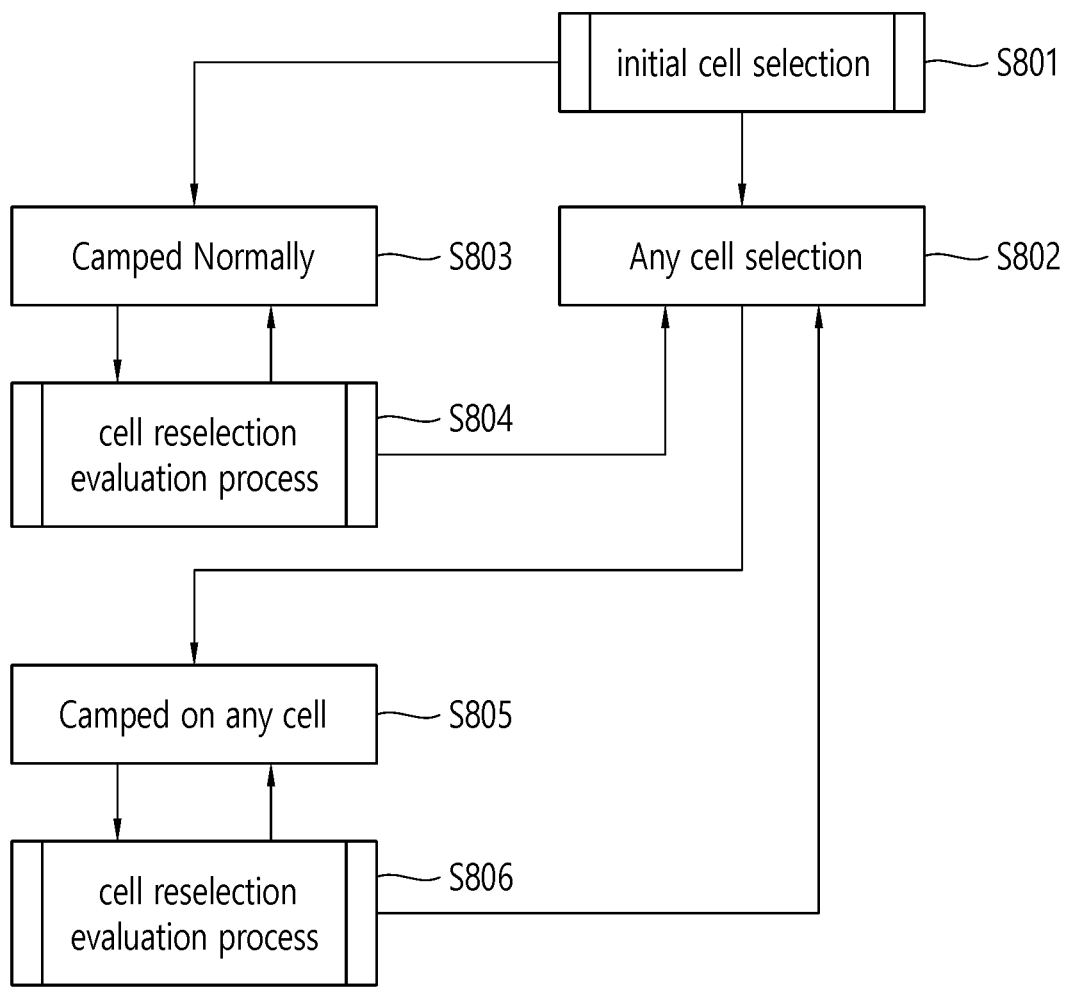
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
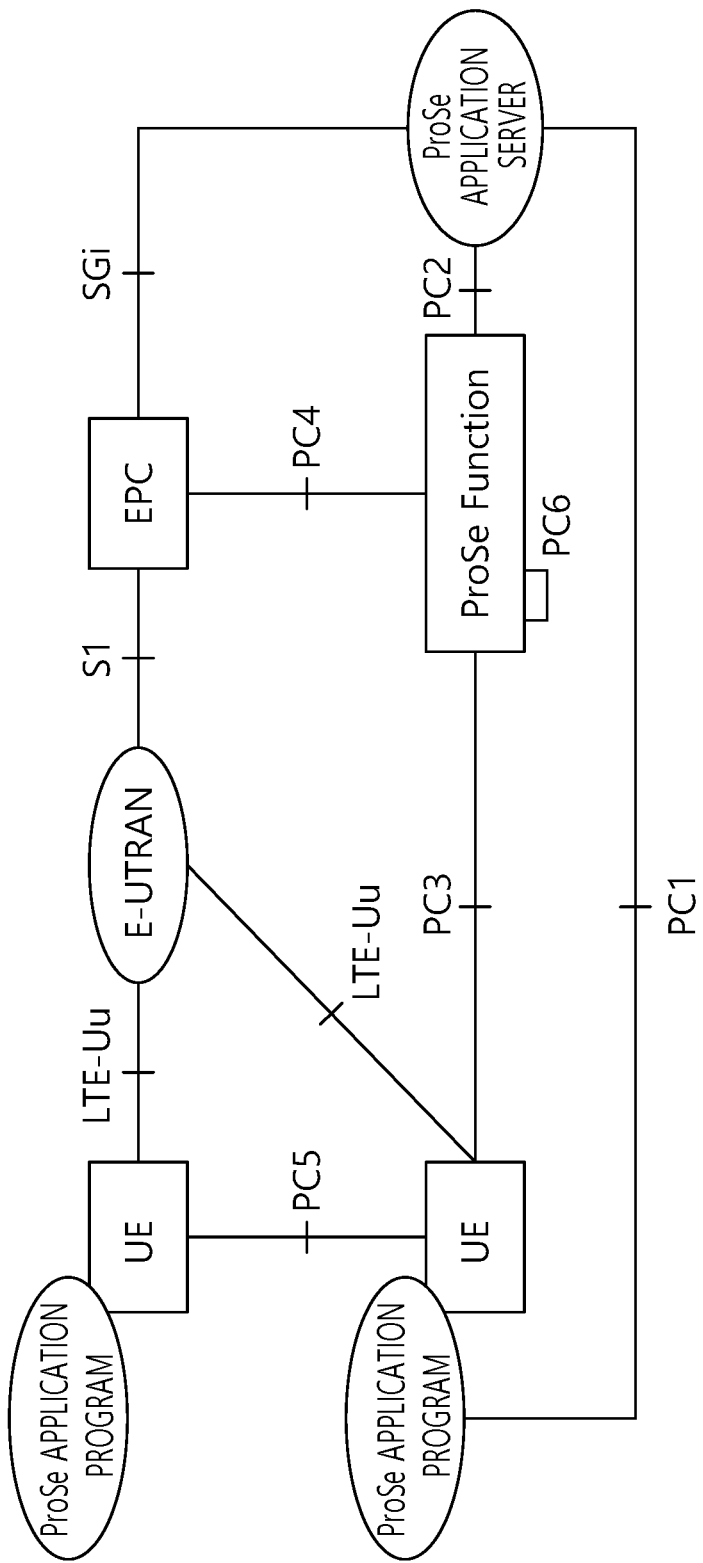
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
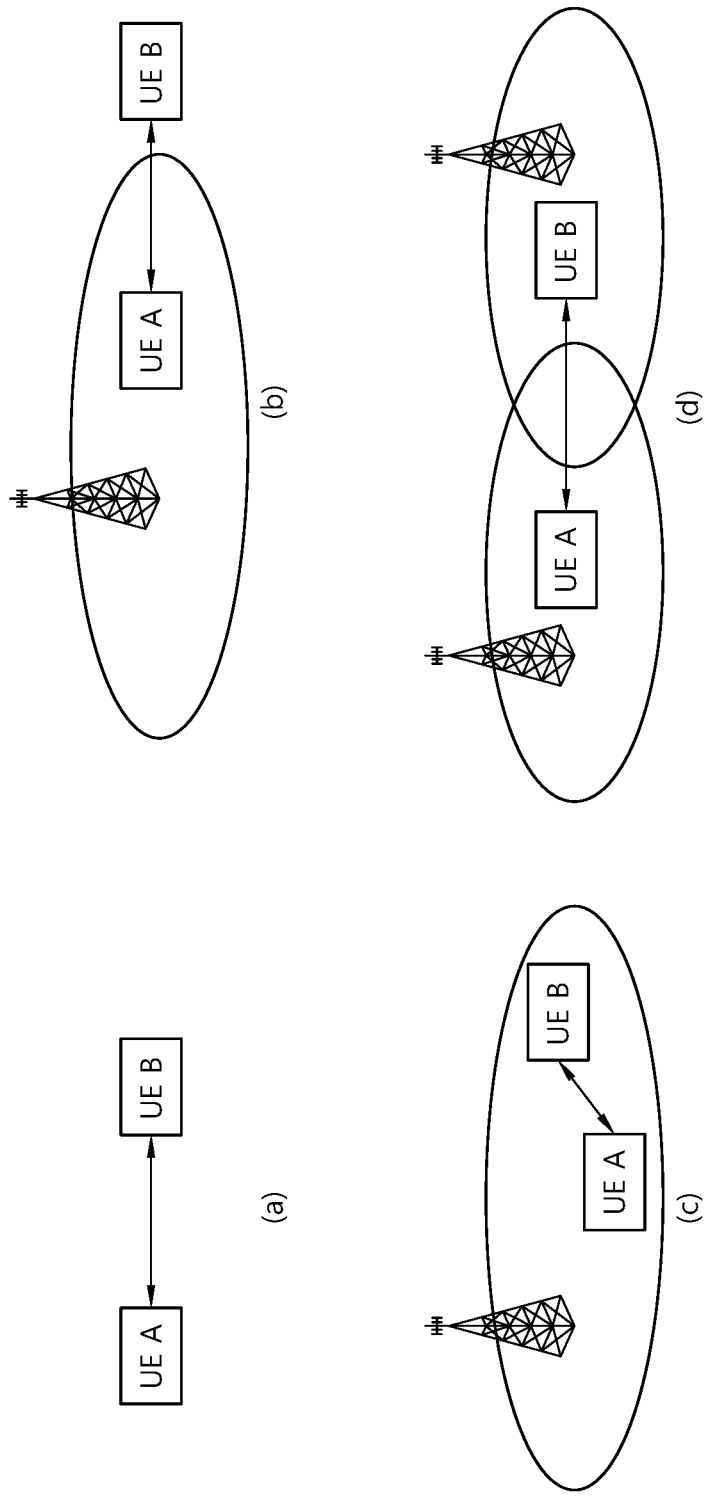
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
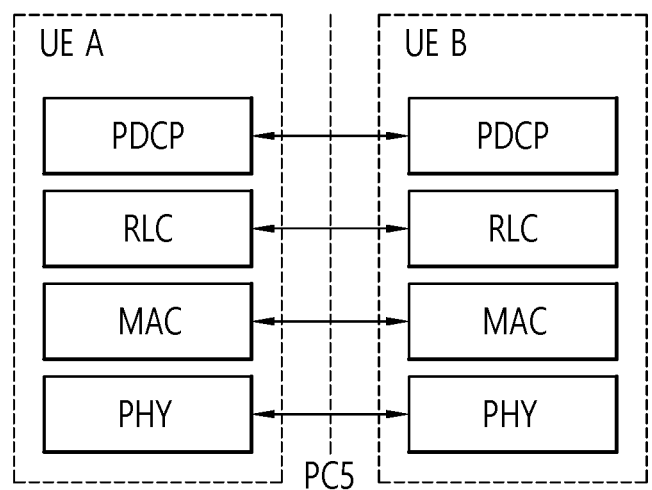
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
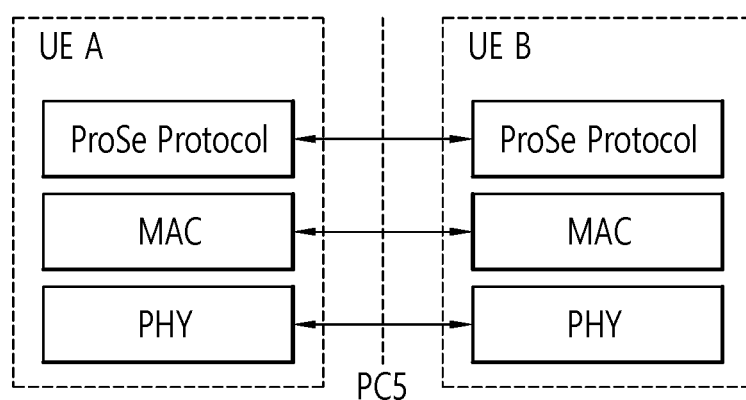
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, a carrier aggregation (CA) system will be described.

An LTE-A system adopts carrier aggregation (CA) and in this case, the carrier aggregation means aggregating multiple component carriers (CCs) and receiving and transmitting the aggregated component carriers (CCs). Through the carrier aggregation, the LTE system enhances a transmission bandwidth of the UE and increases use efficiency of the frequency.

The component carriers may be divided into a primary component carrier (PCC) and a secondary component carrier (SCC). The primary component carrier (PCC) is a component carrier that becomes the center of management of the component carrier when using multiple component carriers and one primary component carrier (PCC0 is defined for each UE. The primary component carrier (PCC) may be referred to as a primary cell (Pcell).

In addition, other component carriers other than one primary component carrier (PCC) may be defined as the secondary component carrier (SCC), the secondary component carrier may be referred to as a secondary cell (SCell), and a UE may perform uplink transmission through the secondary cell.

Figure 13:
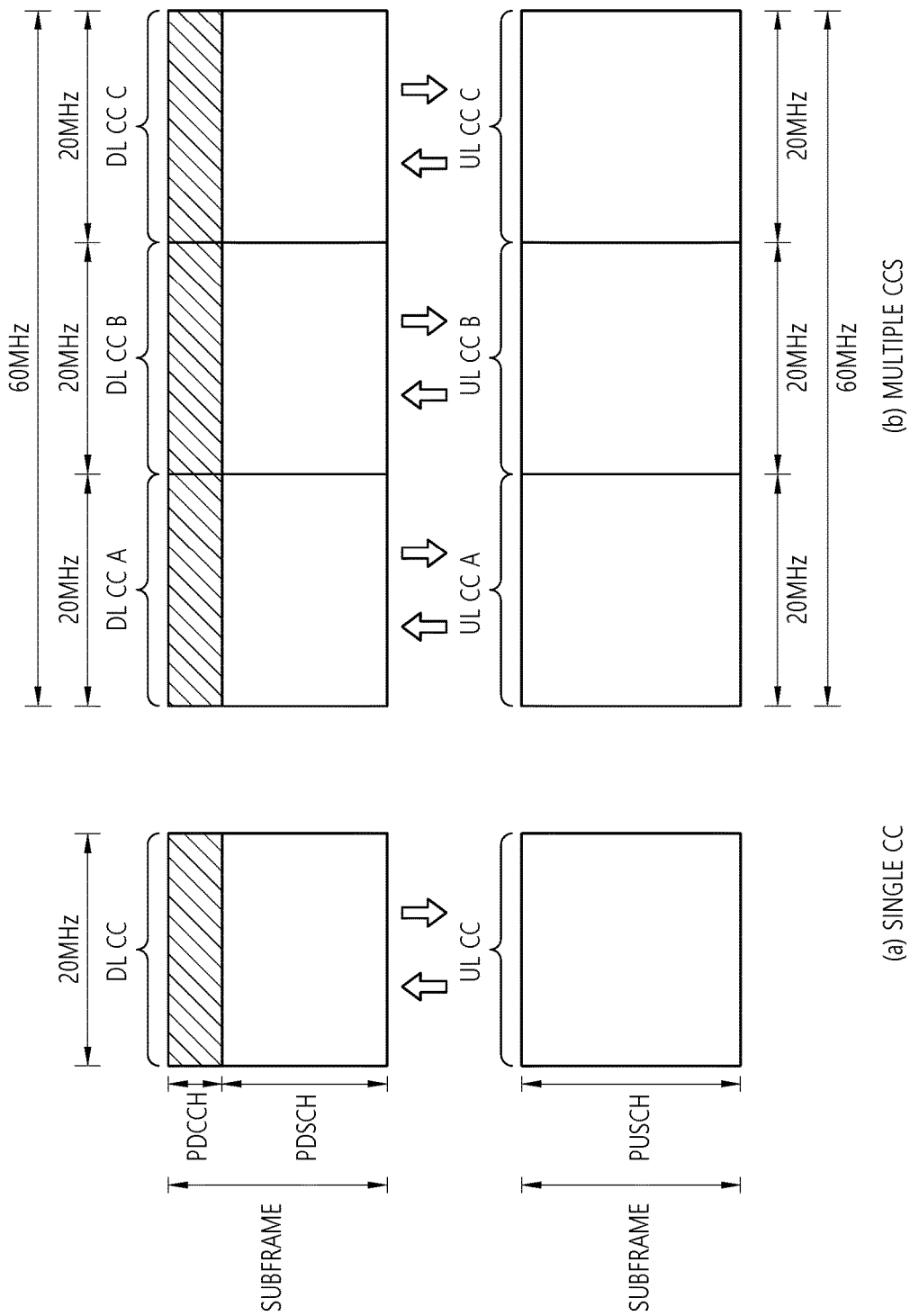
FIG. 13 illustrates a comparative example of a single carrier system and a carrier aggregation system.

FIG. 13 illustrates a comparative example of a single carrier system and a carrier aggregation system.

Referring to FIG. 13, in the single carrier system, only one carrier is supported to a UE in an uplink and a downlink. A bandwidth of the carrier may vary, but one carrier is allocated to the UE. On the contrary, in the carrier aggregation (CA) system, a plurality of element carriers (DL CCs A to C and UL CCs A to C) may be allocated to the UE. For example, three 20 MHz element carriers may be allocated in order to allocate a bandwidth of 60 MHz to the UE.

The carrier aggregation system may be classified into a contiguous carrier aggregation system in which respective carriers are continuous and a non-contiguous carrier aggregation system in which the respective carriers are separated from each other. Hereinafter, when the carrier aggregation system is simply referred to as the carrier aggregation system, it should be understood that the carrier aggregation system includes both cases where the element carriers are continuous and discontinuous.

Element carriers targeted when one or more element carriers are aggregated may just use the bandwidth used in the existing system for backward compatibility with the existing system. For example, in a 3GPP LTE system, bandwidths of 1.4 MHz, 3 MHz, 5 MHz, 10 MHz, 15 MHz, and 20 MHz may be supported and in a 3GPP LTE-A system, a wideband of 20 MHz or more may be configured by using only the bandwidths of the 3GPP LTE system. Alternatively, the wideband may be configured by defining a new bandwidth without using the bandwidth of the existing system.

A system frequency band of the wireless communication system is divided into a plurality of carrier frequencies. Here, the carrier frequency means a center frequency of a cell. Hereinafter, the cell may be constituted by a pair of a downlink frequency resource and an uplink frequency resource. Alternatively, the cell may be constituted only by the downlink frequency resource. In general, in a case where the carrier aggregation (CA) is not considered, the uplink and downlink frequency resources may continuously exist as a pair in one cell.

In order to transmit and receive packet data through a specific cell, the UE needs to first complete a configuration for the specific cell. Here, the configuration means a state in which system information reception required for data transmission to and reception from the corresponding cell is completed. For example, the configuration may include an overall process of receiving common physical layer parameters required for data transmission and reception, MAC layer parameters, or parameters required for a specific operation in an RRC layer. The configuration-completed cell is in a state in which packets are enabled to be immediately transmitted and received when only information that the packet data may be transmitted.

The cell in the configuration completed state may exist in an activation state or a deactivation state. Here, activation means that data transmission or reception is performed or the cell is in a ready state. The UE can monitor or receive a control channel (PDCCH) and a data channel (PDSCH) of the activated cell in order to check resources (frequency, time, etc.) allocated to the UE.

Deactivation means that transmission or reception of traffic data is impossible and measurement or transmission/reception of minimum information is possible. The UE may receive system information (SI) required for receiving the packet from the deactivated cell. On the contrary, the UE may not monitor or receive the control channel (PDCCH) and the data channel (PDSCH) of the deactivated cell in order to check the resources (frequency, time, etc.) allocated thereto.

The cell may be divided into a primary cell (Pcell), a secondary cell (Scell), and a serving cell.

When the carrier aggregation is configured, the UE has only one RRC connection with a network. In an RRC connection establishment/re-establishment/handover process, one cell provides non-access stratum (NAS) mobility information and a security input. Such a cell is referred to as the primary cell. In other words, the primary cell means a cell in which the UE performs an initial connection establishment procedure or a connection reestablishment procedure with the base station or a cell indicated as the primary cell during the handover procedure.

The secondary cell is a cell that is configured to provide additional radio resources once the RRC connection through the primary cell is established.

The serving cell refers to a cell that is configured to provide services to the UE and a UE in which the carrier aggregation is not configured or the carrier aggregation may not be provided is configured by the primary cell. When the carrier aggregation is configured, the serving cell may be constituted by a plurality of serving cells. The plurality of serving cells may be constituted by the primary cell and one or a plurality of sets among all secondary cells.

A primary component carrier (PCC) means a CC corresponding to the primary cell. The PCC is a CC in which the UE initially establishes connection (RRC connection) with the base station among several CCs. The PCC is a special CC for taking charge of connections (connection or RRC connection) for signaling with respect to the several CCs and managing UE context information, which is connection information related to the UE. In addition, the PCC is connected to the UE and continuously exists in an active state when an RRC connected mode is established. A downlink component carrier corresponding to the primary cell is called a downlink primary component carrier (DL PCC) and an uplink component carrier corresponding to the primary cell is called an uplink primary component carrier (UL PCC).

The secondary component carrier (SCC) means a CC corresponding to the secondary cell. That is, the SCC is a CC allocated to the UE in addition to the PCC and the SCC may be an extended carrier extended for additional resource allocation in addition to the PCC, and may be divided into the activated state or the deactivated state. The downlink component carrier corresponding to the secondary cell is referred to as a downlink secondary CC (DL SCC) and the uplink component carrier corresponding to the secondary cell is referred to as an uplink secondary component carrier (UL SCC).

The component carrier constituting the serving cell may constitute one serving cell of the downlink component carrier and the downlink component carrier and the uplink component carrier are connected and configured to constitute one serving cell. In the related art, the serving cell is not constituted by only one uplink component carrier. However, in the present invention, the serving cell may be constituted by only the uplink component carrier.

That is, activation/deactivation of the component carrier is equivalent to a concept of the activation/deactivation of the serving cell. For example, assuming that serving cell 1 is constituted by DL CC 1, activation of serving cell 1 means implies activation of DL CC 1. Assuming that serving cell 2 is constituted by connecting and configuring DL CC2 and UL CC2, activation of serving cell 2 means activation of DL CC 2 and UL CC 2. In such a sense, each component carrier may correspond to the cell.

The number of components carriers aggregated between the downlink and the uplink may be set differently. A case where the number of downlink CCs is equal to the number of uplink CCs is referred to as symmetric aggregation and a case where the number of downlink CCs is different from the number of uplink CCs is referred to as asymmetric aggregation. Further, the sizes (i.e. bandwidths) of the CCs may be different from each other. For example, when five CCs are used for configuration of a 70 MHz band, the configuration of the 70 MHz band may be configured like MHz CC (carrier #0)+20 MHz CC (carrier #1)+20 MHz CC (carrier #2)+20 MHz CC+5 MHz CC (carrier #4).

As described above, the carrier aggregation system may support a plurality of serving cells, that is, a plurality of component carriers (CC) unlike the single carrier system.

Meanwhile, the carrier aggregation system may support cross-carrier scheduling (CCS). The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier. That is, the PDCCH and the PDSCH may be transmitted through different DL CCs and the PUSCH may be transmitted through the UL CC linked with the DL CC in which the PDCCH including a UL grant is transmitted, that is, the UL CC included in another cell, not the UL CC constituting the same cell. Likewise, in a system supporting the cross carrier scheduling, a carrier indicator is required, which indicates through which DL CC/UL CC the PDCCH schedules the PDCCH/PUSCH transmitted. A field including such a carrier indicator is referred to as a carrier indication field (CIF).

The carrier aggregation system that supports the cross carrier scheduling may include the carrier indication field (CIF) in a downlink control information (DCI) format in the related art. In a system supporting the cross carrier scheduling, for example, the LTE-A system, since the CIF is added to the DCI format (i.e., the DCI format used in LTE) in the related art, 3 bits may be extended and in a PDCCH structure, a coding method, a resource allocation method (i.e., CCE based resource mapping), and the like in the related art may be reused.

The base station may configure a PDCCH monitoring DL CC (monitoring CC) set. The PDCCH monitoring DL CC set is constituted by some DL CCs among all DL CCs and when the cross carrier scheduling is configured, the UE performs PDCCH monitoring/decoding only for the DL CCs included in the PDCCH monitoring DL CC set. In other words, the base station transmits the PDCCH for the PDSCH/PUSCH to be scheduled only through the DL CC included in the PDCCH monitoring DL CC set. The PDCCH monitoring DL CC set may be configured to UE-specific, UE-group specific, or cell-specific.

Non-cross carrier scheduling (NCCS) means that scheduling information and the resulting data are received/transmitted within the same carrier (cell) and may be referred to as self-scheduling. The non-cross carrier scheduling may be regarded as a scheduling method applied to a UE in which only a single cell is configured in the related art.

<Timing Advance (TA)>

Hereinafter, a method for determining a timing advance (TA) value associated with D2D transmission on a specific carrier will be described.

1. Before describing the method for determining the timing advance value associated with the D2D transmission, the symbols and abbreviations associated with the timing advance values are as follows.

$T_s$: Basic time unit $N_{TA}$: Timing offset between the uplink and the downlink in the UE, expressed in units of Ts $N_{TA\ offset}$: Fixed timing advance offset, expressed in units of Ts $N_{TA,SL}$: Timing offset between a sidelink and timing reference frames in the UE, expressed in units of Ts 2. Frame Structure In the time domain, the sizes of various fields may be expressed as the number of time units, i.e. Ts=1/(15000×2048) seconds.

Downlink, uplink, and, sidelink transmissions may be configured into THE radio frames with Tf=307200×Ts=10 ms duration.

Hereinafter, two types of radio frame structures may be supported.

Type 1: Applicable to FDD

Type 2: Applicable to TDD

Transmissions in multiple cells may be aggregated with a maximum of four secondary cells in addition to the primary cell. In multi-cell aggregation, different frame structures may be used in different serving cells.

3. Uplink-Downlink Frame Timing

Figure 14:
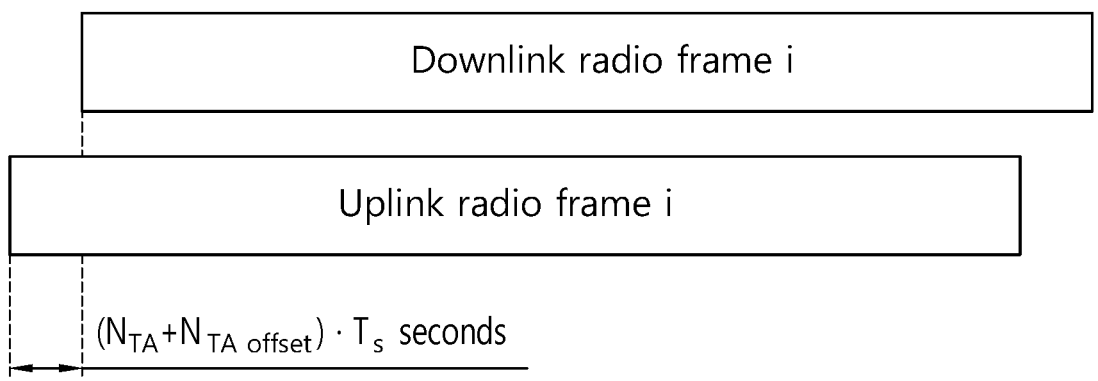
FIG. 14 schematically illustrates an uplink-downlink timing relationship.

FIG. 14 schematically illustrates an uplink-downlink timing relationship. As illustrated in FIG. 14, transmission of uplink radio frame number i from the UE may start earlier than a corresponding downlink radio frame in the UE by (NTA+NTAoffset) xTs second (where 0<=$N_{TA}$<=20412).

Here, for frame structure type 1, $N_{TAoffset}$ may correspond to '0' and for frame structure type 2, $N_{TAoffset}$ may correspond to '624'. In this case, all slots are not transmitted in the radio frame. The example here may correspond to TDD. In this case, only a subset of the slots in the radio frame may be transmitted.

4. Timing

Figure 15:
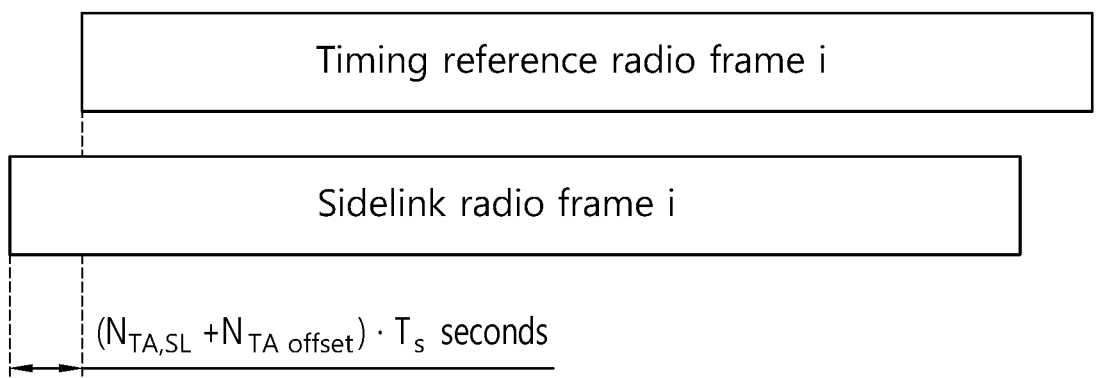
FIG. 15 schematically illustrates a sidelink timing relationship.

FIG. 15 schematically illustrates a sidelink timing relationship. As illustrated in FIG. 15, transmission of sidelink radio frame number i from the UE may start earlier than a corresponding timing reference frame in the UE by $(N_{TA,SL}+N_{TAoffset}) \times T_s$ second (where 0<=$N_{TA}$<=20412).

The UE may not need to receive the sidelink or the downlink transmission earlier than 624 Ts after the sidelink transmission is finished.

In the case where the UE has a serving cell satisfying an S criterion,

The timing of the reference radio frame i may be the same as the downlink radio frame i in the same frame.

A specific value corresponding to $N_{TAoffset}$ may be given.

In other cases,

The timing of the reference radio frame i can be obtained by being inherent by a predetermined method.

$N_{TAoffset}$=0

An amount of $N_{TA,SL}$ between the channel and the signal may be as follows.

$$N_{TA,SL} = \begin{cases} N_{TA} & \text{for PSSCH in sidelink transmission mode 1} \\ 0 & \text{for all other cases} \end{cases} \quad [\text{Equation 2}]$$

Hereinafter, the present invention will be described in detail.

In the related art, in order to perform the D2D transmission in the carrier which has been aggregated through aggregation of a carrier wave (or a carrier, hereinafter, the carrier wave and the carrier are mixed for easy description), the D2D transmission needs to be performed in respective carrier units. Therefore, when there are multiple carriers, the UE performing the D2D operation needs to perform time synchronization or downlink measurement for each carrier. As described above, when the UE performs synchronization or measurement for each carrier, a UE computation amount is excessively increased, resulting in a problem that radio communication efficiency is deteriorated.

In order to solve the aforementioned problem, when the UE performs the D2D operation in a non-primary cell (frequency) in a situation of the carrier aggregation, the UE configures one carrier which becomes a reference and performs the time synchronization or downlink measurement only in the reference carrier.

As described above, when the UE performing the D2D operation performs the time synchronization or downlink measurement through the reference carrier, there is an issue which timing advance (TA) value the UE performing the D2D operation is to use on the carrier on which the D2D transmission is performed.

Accordingly, in the present invention, proposed is a method that efficiently defines a D2D TX associated TA value on CARRIER # X when a D2D transmission timing reference (TX TIMING REFERENCE) of CARRIER # X in which D2D communication is performed is configured as another CARRIER # Y, not CARRIER # X (e.g., TDD system) (or DL CARRIER # X (e.g., FDD system) paired with CARRIER # X)) (via a predefined rule or signaling (e.g., SIB or a dedicated RRC signaling)) in view of the UE (e.g., D2D UE # K) in which D2D is performed.

In summary, in the present invention, a method is intended to be proposed, which efficiently defines the timing advance value associated with the D2D transmission on CARRIER # X when the carrier on which the D2D operation is performed is CARRIER # X and the D2D transmission timing reference of CARRIER # X is configured as another carrier in view of the UE performing the D2D operation.

Here, for example, CARRIER # Y may be the primary cell (PCELL) or the activated (or deactivated) cell (SCELL) (or an intra PLMN serving cell) (for D2D communication) (or an INTRA-PLMN NON-SERVING CELL (for D2D communication) or an INTER-PLMN NON-SERVING CELL (for D2D communication)).

Further, for example, CARRIER # X may be the deactivated (or activated) secondary cell (SCELL) (or the intra-PLMN non-serving cell) (for D2D communication) (or thee intra-PLMN serving cell (for D2D communication) or the inter-PLMN non-serving cell (for D2D communication)).

For example, in view of the D2D UE # K, the D2D TX timing reference of CARRIER # X in which D2D communication is performed is configured as another CARRIER # Y, not CARRIER # X (e.g., TDD CARRIER) (or DL CARRIER # X paired with CARRIER # X and duplex modes (e.g., time division duplexing (TDD) carrier or frequency division duplexing (FDD) carrier) of CARRIER # X and CARRIER # Y are different from each other, a D2D TX associated TA value on CARRIER # A may be configured to be determined through the following (some or all) rules.

Here, for example, the proposed methods of the present invention is extensively applicable even to general cases in which the D2D TX timing reference of the CARRIER # X in which the D2D communication is performed is another CARRIER # Y (e.g., DL CARRIER # Y may be the same duplex mode as CARRIER # X), not CARRIER # X (or DL CARRIER # X paired with CARRIER # X).

Hereinafter, the method for determining the timing advance on the carrier on which the D2D transmission is performed when the D2D transmission timing reference of the carrier on which the D2D transmission is performed is configured as another carrier, not the carrier on which the D2D communication is performed in view of the D2D UE will be described in more detail. Hereinafter, for easy description of the present invention, 'CARRIER # X' and a first carrier may be mixedly used and 'CARRIER # Y' and a second carrier may be mixedly used. That is, CARRIER # X may be commonly referred to as the first carrier, and CARRIER # Y may be commonly referred to as the second carrier.

Figure 16:
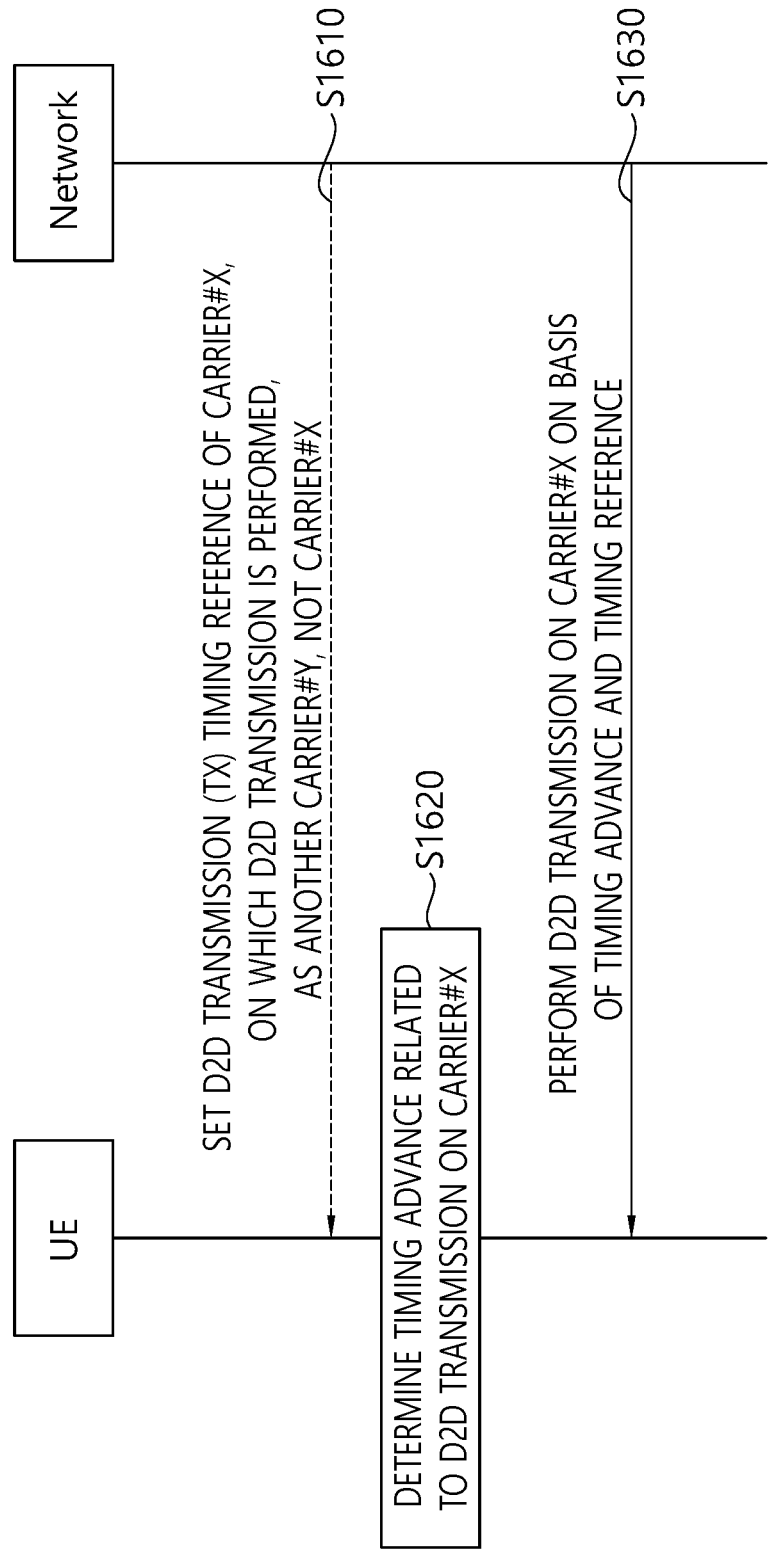
FIG. 16 is a flowchart of a method for determining a timing advance according to an embodiment of the present invention.

FIG. 16 is a flowchart of a method for determining a timing advance according to an embodiment of the present invention.

Referring to FIG. 16, a UE performing a D2D operation may configure a D2D transmission timing reference of a carrier in which the D2D transmission is performed to another carrier, not the carrier in which the D2D transmission is performed (S1610). That is, the UE may configure the D2D transmission timing reference of a first carrier (in other words, CARRIER # X) to a second carrier (in other words, CARRIER # Y). In other words, when a D2D TX timing reference of CARRIER # X in which D2D communication is performed may be configured as another CARRIER # Y, not CARRIER # X (e.g., TDD CARRIER) (or DL CARRIER # X (E.G., FDD CARRIER) paired with CARRIER # X). In this case, the configuration may be made through system information as described above. Further, the configuration may be made through a dedicated RRC signaling as described above. Alternatively, the configuration may be made through a predefined rule.

Here, when a timing reference is configured, the UE may follow a sync (i.e., time synchronization) value or a downlink measurement value of a carrier corresponding to the timing reference, rather than the carrier performing the D2D transmission in which the timing reference is configured.

In other words, when the timing reference of CARRIER # X in which the D2D transmission is performed is CARRIER # Y, the UE may follow a reference, that is, a value of CARRIER # Y is for the sync value and the downlink measurement value of CARRIER # X.

Thereafter, the UE determines the timing advance associated with the D2D transmission to be applied on the carrier on which the D2D transmission is performed (S1620). That is, the UE may determine the timing advance associated with the D2D transmission to be applied on the first carrier (in other words, CARRIER # X).

More specifically, the timing advance may be defined through the following rules.

[Rule #1] The carrier which becomes the timing reference of CARRIER # X D2D TX associated $N_{TA}$ (e.g., $N_{TA,SL}$ and $N_{TA,offset}$) is CARRIER # Y, but the rule may be defined so that the $N_{TA}$ (e.g., $N_{TA,SL}$ and $N_{TA,offset}$) value itself is determined based on CARRIER # X.

For example, when CARRIER # X of mode 2 D2D communication is an FDD carrier and CARRIER # Y is a TDD carrier, the timing reference of the FDD CARRIER # X D2D TX associated $N_{TA}$ (e.g., $N_{TA,SL}$ and $N_{TA,offset}$), becomes TDD CARRIER # Y, but the corresponding $N_{TA,SL}$ and $N_{TA,offset}$ values themselves are set to "0" and "0", respectively according to FDD CARRIER # X of the MODE 2 D2D communication.

In other words, when the carrier (that is, CARRIER # X) of the mode 2 D2D communication corresponds to an FDD carrier and another carrier (i.e., CARRIER # Y), not the carrier which becomes a basis of performing of the D2D communication a TDD carrier, an $N_{TA}$ (e.g., $N_{TA,SL}$ and $N_{TA,offset}$) associated timing reference of the carrier which becomes the basis of the performing of the D2D communication corresponds the another carrier (i.e., TDD carrier; CARRIER # Y), but as the $N_{TA,SL}$ and $N_{TA,offset}$ values themselves, the value of the carrier of the mode 2 D2D communication may be used as it is. In this case, the $N_{TA,SL}$ and $N_{TA,offset}$ values in the mode 2 D2D communication may correspond to "0" and "0", respectively.

As one example, the rule may be defined so that [Rule #1] is limitedly applied only when a specific D2D communication type (e.g., mode 1 D2D communication, mode 2 D2D communication, type 1 D2D discovery, and type 2 D2D discovery) is configured in CARRIER # X and/or when CARRIER # X is regarded as in-coverage (or out-coverage) and when CARRIER # X is the FDD carrier (or TDD carrier) and/or when CARRIER # Y is the TDD carrier (or FDD carrier).

As another example, the carrier which becomes the timing reference of CARRIER # X D2D TX associated $N_{TA}$ (e.g., $N_{TA,SL}$ and $N_{TA,offset}$) is CARRIER # Y, but the rule may be defined so that a pre-configured (or signaled from CARRIER # Y (in advance)) $N_{TA}$ (e.g., $N_{TA,SL}$ and $N_{TA,offset}$) for a corresponding purpose are applied to $N_{TA}$ $N_{TA,SL}$ and $N_{TA,offset}$).

[Rule #2] The rule may be defined so that the carrier which becomes the timing reference of CARRIER # X D2D TX associated $N_{TA}$ (e.g., $N_{TA,SL}$ and $N_{TA,offset}$) and the $N_{TA}$ (e.g., $N_{TA,SL}$ and $N_{TA,offset}$) value itself are determined based on CARRIER # Y.

As a detailed example, when CARRIER # X of mode 2 D2D communication is the FDD carrier and CARRIER # Y is the TDD carrier, the timing reference of the FDD CARRIER # X D2D TX associated $N_{TA}$ (e.g., $N_{TA,SL}$ and $N_{TA,offset}$) becomes TDD CARRIER # Y and the corresponding $N_{TA,SL}$ and $N_{TA,offset}$ values themselves are also set to "TDD CARRIER # Y based $N_{TA}$" and "624$T_s$", respectively according to TDD CARRIER # Y.

That is, when the carrier (that is, CARRIER # X) in which the mode 2 D2D communication is performed corresponds to the FDD carrier and the carrier (i.e., CARRIER # Y) which becomes a target of the timing reference corresponds to the TDD carrier, the $N_{TA}$ (e.g., $N_{TA,SL}$ and $N_{TA,offset}$) associated timing reference of the carrier in which the D2D communication is performed becomes CARRIER # Y and the $N_{TA,SL}$ and $N_{TA,offset}$ values themselves of the CARRIER # X may also be determined as the value of CARRIERY. In this case, since as the $N_{TA,SL}$ and $N_{TA,offset}$ of CARRIER # X, the value of the CARRIERY is adopted, the $N_{TA,SL}$ and $N_{TA,offset}$ of CARRIER # X may be determined as "TDD CARRIER # Y based $N_{TA}$" and "624$T_s$", respectively.

As one example, the rule may be defined so that [Rule #2] is limitedly applied only when a specific D2D communication type (e.g., mode 1 D2D communication, mode 2 D2D communication, type 1 D2D discovery, and type 2 D2D discovery) is configured in CARRIER # X and/or when CARRIER # X is regarded as in-coverage (or out-coverage) and when CARRIER # X is the FDD carrier (or TDD carrier) and/or when CARRIER # Y is the TDD carrier (or FDD carrier).

As another example, the carrier which becomes the timing reference of CARRIER # X D2D TX associated $N_{TA}$ (e.g., $N_{TA,SL}$ and $N_{TA,offset}$) is CARRIER # Y, but the rule may be defined so that an $N_{TA}$ (e.g., $N_{TA,SL}$ and $N_{TA,offset}$) for a corresponding purpose, which is signaled (in advance) (or pre-configured) from CARRIER # Y are applied to $N_{TA}$ (e.g., $N_{TA,SL}$ and $N_{TA,offset}$).

As yet another example, in view of D2D UE # K, when CARRIER # X in which the D2D communication is performed is determined (or regarded) as out-coverage and the D2D TX timing reference of CARRIER # X is configured as predefined (or signaled) TDD CARRIER # Y, the timing reference of CARRIER # X D2D TX associated $N_{TA}$ (e.g., $N_{TA,SL}$ and $N_{TA,offset}$) may become TDD CARRIER # Y according to [Rule #1], but the corresponding $N_{TA,SL}$ and $N_{TA,offset}$ themselves may be set to "0" and "0", respectively according to OUT-COVERAE CARRIER # X or the timing reference of CARRIER # X D2D TX associated $N_{TA}$ (e.g., $N_{TA,SL}$ and $N_{TA,offset}$) becomes TDD CARRIER # Y and the corresponding $N_{TA,SL}$ and $N_{TA,offset}$ themselves may also be set to "TDD CARRIER # Y based $N_{TA}$" and "624 Ts", respectively according to TDD CARRIER # Y.

As still yet another example, in view of D2D UE # K, when CARRIER # X in which the D2D communication is performed is determined (or regarded) as out-coverage and the D2D TX timing reference of CARRIER # X is configured as predefined (or signaled) FDD CARRIER # Y, the timing reference of CARRIER # X D2D TX associated $N_{TA}$ (e.g., $N_{TA,SL}$ and $N_{TA,offset}$) may become FDD CARRIER # Y according to [Rule #1], but the corresponding $N_{TA,SL}$ and $N_{TA,offset}$ themselves may be set to "0" and "0", respectively according to out-coverage CARRIER # X or the timing reference of CARRIER # X D2D TX associated $N_{TA}$ (e.g., $N_{TA,SL}$ and $N_{TA,offset}$) becomes FDD CARRIER # Y and the corresponding $N_{TA,SL}$ and $N_{TA,offset}$ themselves may also be set to "FDD CARRIER # Y based $N_{TA}$" and "0", respectively according to FDD CARRIER # Y.

Thereafter, the UE may perform the D2D transmission on the CARRIER # X based on the timing advance and the timing reference (S1630).

In still yet another example, when a specific D2D TX (and/or RX) resource pool configuration associated with CARRIER # X for D2D UE # K is received from CARRIER # Y via a predefined signaling (e.g., SIB and dedicated RRC signaling)), the rule may be defined so that the corresponding (CARRIER # X associated) specific D2D TX (and/or RX) resource pool configuration associated duplex (e.g., FDD or TDD) dependency via the following (some or all) rules (or (newly defined) signaling (e.g., SIB and reception of dedicated RRC signaling)).

Hereinafter, the method for construing/determining the D2D transmission resource pool configuration on the carrier in which the D2D transmission is performed when the D2D transmission resource pool configuration of the carrier in which the D2D transmission is performed is received by another carrier, not the carrier in which the D2D communication in view of the D2D UE will be described in more detail.

Figure 17:
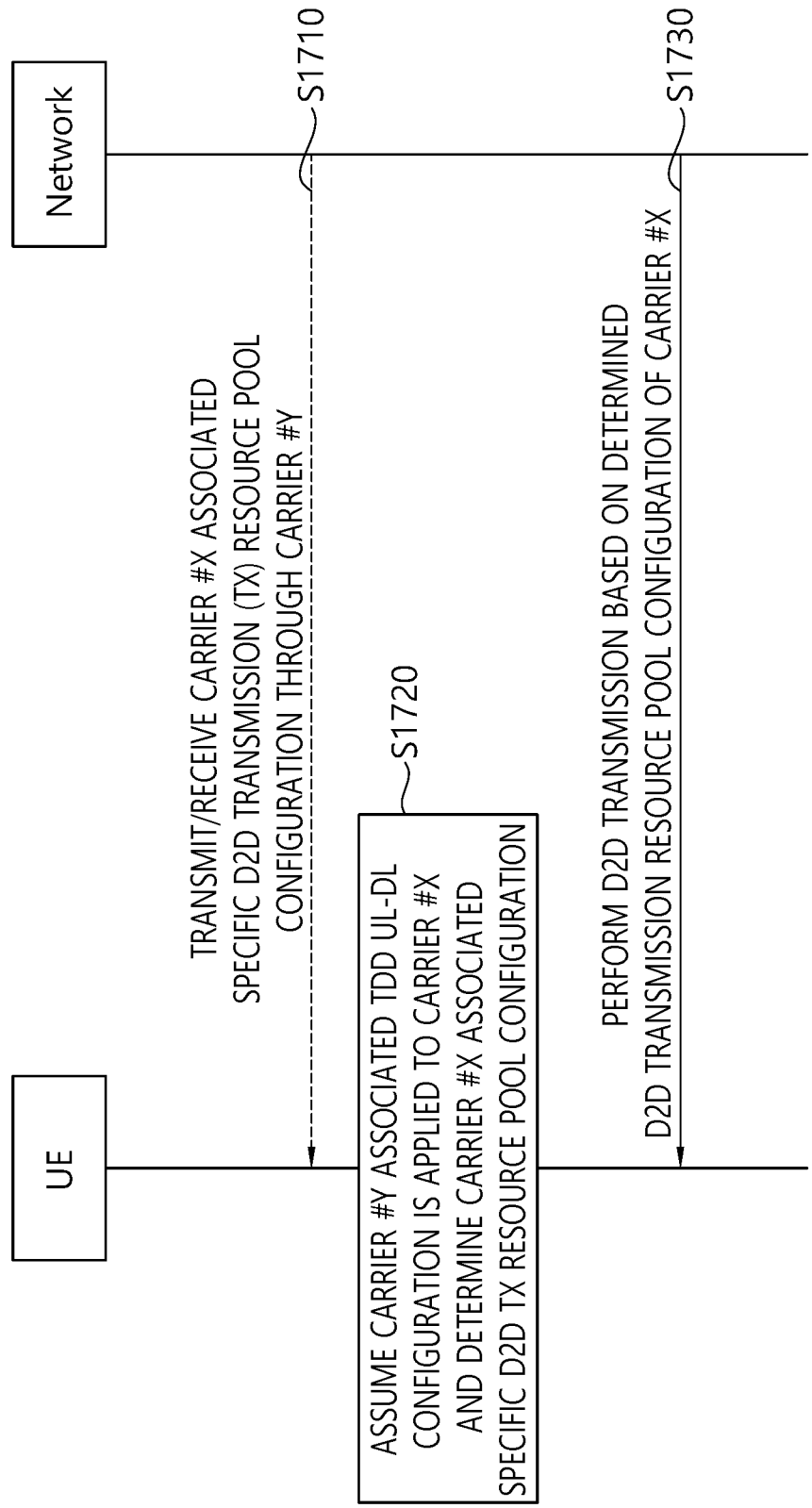
FIG. 17 is a flowchart of a method for configuring a D2D transmission resource pool according to an embodiment of the present invention.

FIG. 17 is a flowchart of a method for configuring a D2D transmission resource pool according to an embodiment of the present invention.

Referring to FIG. 17, the UE may receive a specific D2D transmission resource pool configuration associated with a carrier (e.g., CARRIER # X) in which the D2D transmission is performed through another carrier (CARRIER # Y), not the carrier in which the D2D transmission is performed (S1710). That is, the UE may receive the specific D2D transmission resource pool configuration associated with the first carrier in which the D2D transmission is performed through the second carrier. In other words, the specific D2D TX (and/or RX) resource pool configuration associated with CARRIER # X for the D2D UE # K may be received from CARRIER # Y via the predefined signaling (e.g., SIB and dedicated RRC signaling).

Then, it is possible to apply/determine the specific D2D TX resource pool configuration associated with the CARRIER # X, assuming that CARRIER # Y associated TDD UL-DL configuration (or DUPLEX mode) is applied to CARRIER # X (S1720). For example, the UE may assume that the carrier-related TDD UL-DL configuration (or DUPLEX mode) associated with to the specific D2D transmission resource pool configuration received through another carrier, not the carrier in which the D2D transmission is performed is applied to the carrier in which the D2D transmission is performed and apply/construe the corresponding received specific D2D transmission resource pool. For example, the UE may apply/determine the specific D2D transmission resource pool configuration received through the second carrier based on the assumption/method described above to/as the resource pool configuration of the first carrier.

More specifically, there may be two types of 1) a method in which the UE uses information associated with the resource pool configuration of CARRIER # Y when applying the resource pool configuration of CARRIER # X and 2) a method in which the UE separately acquires information associated with the resource pool of CARRIER # X through CARRIER # Y and uses the acquired information associated with the resource pool of CARRIER # X when applying the resource pool configuration of CARRIER # X. In this case, the former (i.e., 1) the method in which the UE uses the information associated with the resource pool configuration of CARRIER # Y itself when applying the resource pool configuration of CARRIER # X) is specifically described through [Rule #3] and the latter (i.e., 2) the method in which method in which the UE separately acquires the information associated with the resource pool of CARRIER # X through CARRIER # Y and uses the acquired information associated with the resource pool of CARRIER # X when applying the resource pool configuration of CARRIER # X) is more specifically through [Rule #4].

[Rule #3] When the specific D2D TX (and/or RX) resource pool configuration associated with CARRIER # X is received from CARRIER # Y through a predefined signaling (e.g., SIB and dedicated RRC signaling), a corresponding (CARRIER # X associated) specific D2D TX (and/or RX) resource pool configuration may be construed to be configured by assuming that the CARRIER # Y associated TDD UL-DL configuration (or DUPLEX mode) is applied (or succeeded) to CARRIER # X.

When such a rule is applied, for example, SA PERIOD or T-RPT (which may be configured in CARRIER # X), a bitmap pattern of the resource pool, or the like varies according to a type of the CARRIER # Y associated TDD UL-DL configuration (or DUPLEX mode) applied to CARRIER # X.

For example, the rule may be defined so that an operation in which the CARRIER # Y associated TDD UL-DL configuration is applied (or succeeded) to CARRIER # X is limitedly applied only when CARRIER # X is the TDD carrier.

Further, for example, the rule may be defined (e.g., enabled to be construed as D2D TX (and/or RX) resource pool configuration-specific TDD UL-DL configuration information) so that the CARRIER # Y associated TDD UL-DL configuration (or DUPLEX mode) information assumed at the time of applying the specific D2D TX (and/or RX) resource pool configuration is notified together with the specific D2D TX (and/or RX) resource pool configuration through the predefined signaling.

For example, the rule may be defined so that [Rule #3] is limitedly applied only when [Rule #2] (and/or [Rule #1]) described above is applied.

[Rule #4] When the specific D2D TX (and/or RX) resource pool configuration associated with CARRIER # X is received from CARRIER # Y through the predefined signaling (e.g., SIB and dedicated RRC signaling), the corresponding (CARRIER # X associated) specific D2D TX (and/or RX) resource pool configuration may be construed to be configured by "assuming that the CARRIER # X associated TDD UL-DL configuration (or DUPLEX mode) is applied (or succeeded) to CARRIER # X" and/or "assuming that a preconfigured (or signaled together with the specific D2D TX (and/or RX) resource pool configuration) specific TDD UL-DL configuration (or Duplex mode) (for such a purpose) is applied to CARRIER # X".

When such a rule is applied, for example, the SA PERIOD or T-RPT (which may be configured in CARRIER # X), the bitmap pattern of the resource pool, or the like varies according to the type of the TDD UL-DL configuration (or DUPLEX mode) applied to CARRIER # X. For example, the rule may be defined so that [Rule #4] is limitedly applied only when [Rule #1] (and/or [Rule #2]) described above is applied.

Thereafter, the UE may perform the D2D transmission based on the determined D2D transmission resource pool configuration of CARRIER # X (S1730).

It is obvious that since the examples of the proposed method described above may also be included as one of implementing methods of the present invention, the examples may be regarded as a kind of proposed methods. Further, the proposed methods described above may be independently implemented, but implemented in combination (or merge) of some of the proposed methods.

The rule may be defined may be defined such that the proposed methods are limitedly applied only in an FDD system (and/or TDD system) environment.

The rule may be defined so that the proposed methods described above are limitedly applied only to mode 2 communication and/or type 1 discovery (and/or mode 1 communication and/or type 2 discovery).

In addition, the rule may be so that the proposed methods are limitedly applied only to in-coverage D2D UE (and/or out-coverage D2D UE) (and/or RRC connected D2D UE (and/or RRC_IDLE D2D UE)).

The rule may be defined so that the proposed methods are limitedly applied only to the D2D UE (and/or D2D UE performing only a D2D communication (transmission/reception) operation) that performs only a D2D discovery (transmission/reception) operation.

The rule may be defined so that the proposed methods are limitedly applied only in a scenario (and/or only the D2D communication is supported (configured)) in which only the D2D discovery is supported (configured).

In addition, the rule may be defined so that the proposed methods are limitedly applied only in a situation where a carrier aggregation technique (CA) is applied (and/or the carrier aggregation technique is not applied).

The rule may be defined so that the proposed methods are limitedly applied only in a case where a D2D discovery signal receiving operation in another (UL) carrier on an inter-frequency is performed (and/or a case where the D2D discovery signal receiving operation in another inter-PLMN based PLMN (UL) carrier) is performed.

An example for a case where the method of determining the timing advance and the method for applying/construing the D2D transmission resource pool configuration are combined or merged may be illustrated as follows.

Figure 18:
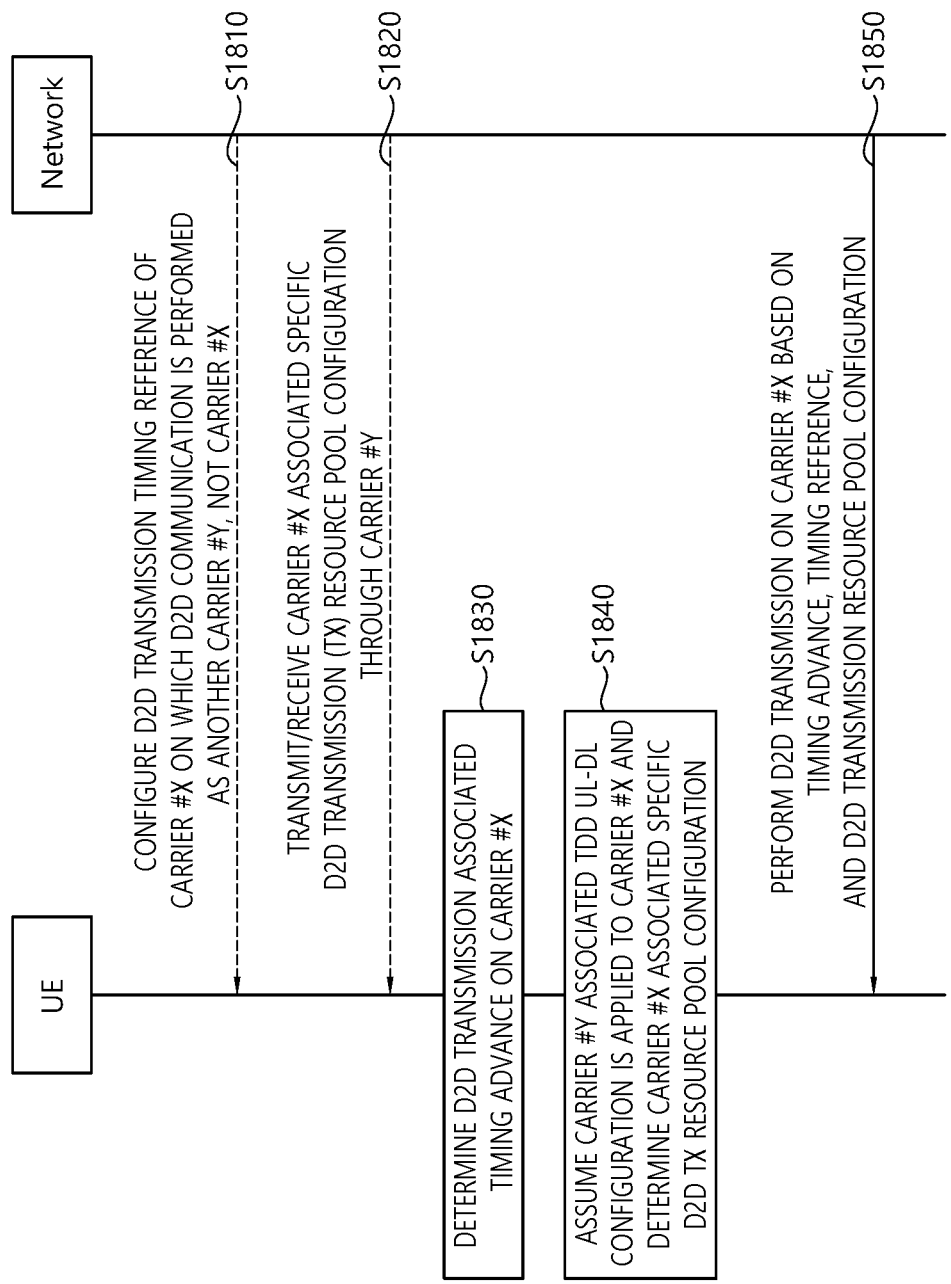
FIG. 18 is a flowchart of a method for applying/construing the D2D transmission resource pool according to an embodiment of the present invention.

FIG. 18 is a flowchart of a method for applying/construing the D2D transmission resource pool according to an embodiment of the present invention.

Referring to FIG. 18, the UE may configure the D2D transmission timing reference of CARRIER # X in which the D2D communication is performed to another CARRIER # Y, not CARRIER # X (S1810). In this case, detailed contents of the configuration are as described above.

The UE may receive the specific D2D transmission (TX) resource pool configuration associated with CARRIER # X through CARRIER # Y simultaneously with step S1810, before or after step S1810 (S1820). Detailed contents in which the UE receives the specific D2D transmission (TX) resource configuration associated with CARRIER # X through CARRIER # Y are as described above.

The UE may determine the timing advance associated with the D2D transmission on the CARRIER # X (S1830). Detailed contents in which the UE determines the timing advance associated with the D2D transmission on the CARRIER # X.

Simultaneously with step S1830 or before or after step S1830, the UE may assume that CARRIER # Y associated TDD UL-DL configuration (or DUPLEX mode) is applied to CARRIER # X and apply/determine the CARRIER # X associated specific D2D TX resource pool configuration (S1840). For example, the UE may assume that the carrier-related TDD UL-DL configuration (or DUPLEX mode) associated with to the specific D2D transmission resource pool configuration received through another carrier, not the carrier in which the D2D transmission is performed is applied to the carrier in which the D2D transmission is performed and apply/analyze the corresponding received specific D2D transmission resource pool. For example, the UE may apply/determine the specific D2D transmission resource pool configuration received through the second carrier based on the assumption/method described above to/as the resource pool configuration of the first carrier. Detailed contents in which the UE applies/determines the CARRIER # X associated specific D2D transmission (TX) resource pool configuration to/as the D2D transmission resource pool configuration of CARRIER # X are as described above.

Thereafter, the UE may perform the D2D transmission on the CARRIER # X based on the timing advance, the timing reference, and the D2D transmission resource pool configuration (S1850).

Figure 19:
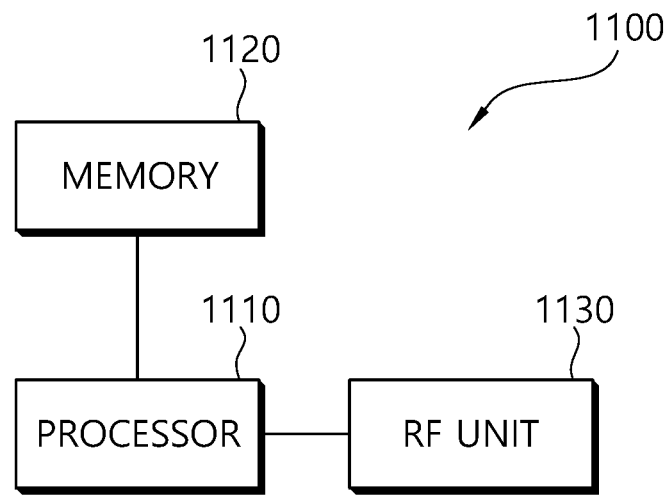
FIG. 19 is a block diagram illustrating a UE in which the embodiment of the present invention is implemented.

FIG. 19 is a block diagram illustrating a UE in which the embodiment of the present invention is implemented.

Referring to FIG. 19, the UE 1100 includes a processor 1110, a memory 1120, and a radio frequency (RF) unit 1130. The processor 1110 implements a function, a process, and/or a method which are proposed. For example, the processor 1110 may configure a D2D transmission (TX) timing reference of CARRIER # X in which D2D transmission is performed as another CARRIER # Y, not CARRIER # X. Further, the processor 1110 may be configured to determine a timing advance associated with the D2D transmission on CARRIER # X. In addition, the processor 1110 may be configured to perform the D2D transmission on CARRIER # X based on the timing advance and the timing reference (S1630).

The RF unit 1130 is connected with the processor 1110 to transmit and receive a radio signal.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

What is claimed is:

1. A method for performing device-to-device (D2D) transmission in a wireless communication system, the method performed by a user equipment (UE) and comprising:
    receiving, from a base station, configuration information,
    wherein a timing reference of a first carrier on which the D2D transmission is performed is configured based on the configuration information; and
    based on determining a mode 2 D2D communication is to be performed on the first carrier, performing a mode 2 D2D transmission on the first carrier based on the timing reference and timing advance (TA) information,
    wherein the TA information is information related to the mode 2 D2D transmission and is applied to the first carrier,
    wherein a carrier aggregation (CA) is configured at the UE, both the first carrier and a second carrier for the CA are configured at the UE, and the first carrier is aggregated with the second carrier,
    wherein the first carrier and the second carrier are carriers of the base station,
    wherein the timing reference of the first carrier is the second carrier which is different from the first carrier,
    wherein the first carrier is a carrier based on a frequency division duplex (FDD), and the second carrier is a carrier based on a time division duplex (TDD),
    wherein the first carrier is a primary cell (PCell) and the second carrier is a deactivated secondary cell (SCell),
    wherein, when the mode 2 D2D communication is performed on the first carrier, the timing reference of the TA information for the first carrier is determined based on the second carrier and a value of the TA information itself is determined based on the first carrier, and
    wherein, on the mode 2 D2D communication, the UE performs the mode 2 D2D transmission with another UE based on a D2D resource which is selected by the UE itself.

2. The method of claim 1, wherein the TA information includes $N_{TA,SL}$ and $N_{TA,offset}$,
    wherein the $N_{TA,SL}$ is a timing offset between a sidelink frame and a timing reference frame, and
    wherein the $N_{TA,offset}$ is a fixed TA offset.

3. A user equipment (UE) for performing device-to-device (D2D) transmission, the UE comprising:
    a transceiver configured to transmit and receive a radio signal; and
    a processor operated in association with the transceiver, wherein the processor is configured to:
    control the transceiver to receive, from a base station, configuration information,
    wherein a timing reference of a first carrier on which the D2D transmission is performed is configured based on the configuration information; and
    based on determining a mode 2 D2D communication is to be performed on the first carrier, perform a mode 2 D2D transmission on the first carrier based on the timing reference and timing advance (TA) information,
    wherein the TA information is information related to the mode 2 D2D transmission and is applied to the first carrier,
    wherein a carrier aggregation (CA) is configured at the UE, both the first carrier and a second carrier for the CA are configured at the UE, and the first carrier is aggregated with the second carrier,
    wherein the first carrier and the second carrier are carriers of the base station,
    wherein the timing reference of the first carrier is the second carrier which is different from the first carrier,
    wherein the first carrier is a carrier based on a frequency division duplex (FDD), and the second carrier is a carrier based on a time division duplex (TDD),
    wherein the first carrier is a primary cell (PCell) and the second carrier is a deactivated secondary cell (SCell),
    wherein, when the mode 2 D2D communication is performed on the first carrier, the timing reference of the TA information for the first carrier is determined based on the second carrier and a value of the TA information itself is determined based on the first carrier, and
    wherein, on the mode 2 D2D communication, the UE performs the mode 2 D2D transmission with another UE based on a D2D resource which is selected by the UE itself.

4. The UE of claim 3, wherein the TA information includes $N_{TA,SL}$ and $N_{TA,offset}$,
    wherein the $N_{TA,SL}$ is a timing offset between a sidelink frame and a timing reference frame, and
    wherein the $N_{TA,offset}$ is a fixed TA offset.

* * * * *